UNITED STATES PATENT OFFICE.

FREELAND J. MORRISON, OF CORNELL, WISCONSIN, ASSIGNOR TO CORNELL WOOD PRODUCTS CO., OF CHICAGO, ILLINOIS, A CORPORATION OF WISCONSIN.

SIZING COMPOSITION.

1,365,715.   Specification of Letters Patent.   Patented Jan. 18, 1921.

No Drawing.   Application filed June 9, 1919.   Serial No. 302,727.

*To all whom it may concern:*

Be it known that I, FREELAND J. MORRISON, a citizen of the United States, and a resident of the village of Cornell, in the county of Chippewa and State of Wisconsin, have invented certain new and useful Improvements in Sizing Compositions, of which the following is a specification.

This invention relates to sizing compositions and solutions and although not limited to such use these compositions and solutions are particularly adapted for use in sizing wood, paper and similar pulp boards or sheets and articles consisting largely of cellulose or other fibrous or absorbent materials.

The principal object of the invention is to provide a sizing composition which will make the material treated more impervious or retardant to absorption of moisture and liquids, including organic liquids, more durable, stronger and more rigid than similar materials treated with other sizing compositions.

I have found that if the solid constituents of the sizing solution consists largely of an alkaline soluble non-crystalline inorganic material, such as a soluble sodium silicate, e. g., water-glass, $Na_2Si_4O_9$, the resulting product is much more rigid, durable and impervious than if sized with glue as employed heretofore.

The results are also improved by adding to the silicate or other solution a small amount of an organic adhesive such as glue.

I have also found that when such organic adhesive is employed the amount of sodium silicate which will stay in solution is reduced so that the viscosity of a solution containing both silicate and adhesive is lower than that of a saturated solution of silicate alone and is also lower than is desirable.

If the viscosity is too low there is more penetration than is necessary since the essential factor is to form an impervious or relatively non-absorbent surface film and the material which penetrates the material is lost so far as the formation of a surface film is concerned.

Therefore, to increase the viscosity a filler is employed which may conveniently be a finely divided inorganic material such as pottery clay or an organic material such as casein or starch.

Although I prefer to employ a soluble silicate, in some cases caustic alkali or other substances having an alkaline reaction such as soda ash may be used in its place. In such cases the amount of filler employed is ordinarily greater than when the silicate is employed.

It is believed that the sodium silicate by virtue of its alkaline action acts on cellulose fibers in a similar manner to the action of caustic alkali in the mercerization of cotton. The fibers on the surface of the sheet appear to puff up and become softened so that they are readily penetrated by the solution and the pores and interstices filled by the clay, casein, starch or other material in suspension.

When caustic alkali or soda ash are used in the sizing solution substantially the same action on the fibers takes place.

The sodium silicate as its name "water-glass" implies, dries to a glassy transparent mass which makes the material more impervious especially to organic liquids such as those employed in making paints, varnishes and the like. In general, organic substances are more soluble in organic liquids than inorganic liquids and inorganic substances are more soluble in inorganic solvents than organic solvents. The dried salt also has very considerable mechanical strength.

The addition of an organic adhesive not only increases the strength of the resulting product but also on account of its colloidal properties prevents any tendency of the sodium silicate to crystallize.

The filler employed not only increases the viscosity but also fills the voids between the fibers which would otherwise have to be filled with silicate and glue. The use of such materials therefore, replaces a part of the silicate and glue.

As the sodium silicate is non-crystalline in its character, particularly in the presence of a colloid such as glue, not only are the surface fibrous layers saturated but also the voids between the fibers are filled so that a continuous film is formed over the entire surface. This film of silicate and other materials gives a hard glass-like surface, which retards the penetration of paints, water or atmospheric moisture. By reducing the penetration of paints the area which can be covered by a given quantity of paint is increased.

Thus I have found that the amount of paint required to coat a given area of material treated with my sizing composition is much less than with surfaces treated with other sizing compositions. Further the amount of paint required is not greater six months after the size has been applied than ten days afterward. Further I have found that the appearance of a single coat of paint on a surface treated with my composition is better than that of two coats on other sized surfaces.

I have also discovered that a board saturated with my composition expands and contracts much less than boards treated with other sizing compositions under the same conditions.

This is probably largely due to the exclusion of atmospheric moisture by the sizing composition. The relatively low expansion and contraction of pulp boards treated in this way makes them particularly applicable for forming the surface of room walls or the like, where the boards are attached to relatively inexpansible materials.

Wood or paper pulp boards treated with my solution are further found to be much stronger under the Mullen test than untreated boards or boards treated with other sizing solutions.

While my material is designed primarily for treating wood or paper pulp boards already formed, the material may be employed in the manufacture of such boards particularly where the boards are made of several plies of paper or thin board secured together. In such cases my sizing solution may be placed on the various plies and the whole subjected to pressure by rolls or other suitable means.

The composition is also adapted for sizing writing or other paper to render it non-absorbent and give it a smooth glassy surface.

The proportions of the various constituents employed in the solution are preferably retained within the following limits:—3 to 15% by weight of non-crystalline inorganic material such as sodium silicate; 1 to 7% of an organic adhesive such as glue; 1 to 8% of a filler such as clay, casein or starch and the rest water. When caustic alkali for example caustic soda is used, the preferred proportions are 0.5 to 3% by weight of caustic alkali, 1 to 7% of organic adhesive and 8 to 50% of a filler.

The amount of water may be varied relatively to the solid constituents but preferably the relative quantities of the various solid ingredients to each other are not changed greatly outside the foregoing limits. In particular where sodium silicate is employed the amount of organic adhesive should not be ordinarily in excess of the weight of silicate employed. In certain cases, however, especially when sodium silicate is used the filler may be omitted entirely.

In the preferred method of preparing the composition, to 75 gallons of cold water 37½ lbs. of high grade glue or a correspondingly larger amount of lower grade glue, are added and the mixture allowed to stand from 3 to 36 hours. The mixture is then heated to between 130 to 160° F. for about 15 minutes after which 25 gallons of 40° Bé. sodium silicate solution is added slowly while the liquid is being stirred. Owing to the greater specific gravity of the silicate solution the latter tends to fall through the glue solution and thereby mix with the latter. If on the other hand the glue solution is added to the silicate solution the former being lighter will tend to remain on top and not to mix with the solution beneath. Consequently I prefer to add the silicate to the glue. Finally 29 lbs. of pottery clay are added and thoroughly incorporated in the mixture. In some cases the clay is mixed with the sodium silicate solution before the latter is added to the glue. The size is then ready for use.

I am aware that numerous details may be varied through a wide range without departing from the principles of this invention and I therefore do not purpose limiting the patent granted hereon otherwise than necessitated by the prior art.

I claim as my invention:

1. A sizing composition comprising water, 3 to 15 parts by weight of sodium silicate, 1 to 7 parts of an organic adhesive and 1 to 8 parts of a filler.

2. A sizing composition comprising 3 to 15% of sodium silicate, 1 to 7% of an organic adhesive, 1 to 8% of a filler and water.

In testimony whereof I have hereunto subscribed my name in the presence of two subscribing witnesses.

FREELAND J. MORRISON.

Witnesses:
RIDSDALE ELLIS,
EARL M. HARDINE.